United States Patent [19]

Kuehnle et al.

[11] Patent Number: 4,628,367
[45] Date of Patent: Dec. 9, 1986

[54] METHOD AND DEVICE FOR READING DIGITAL DATA IN AN OPTICAL MASS MEMORY SYSTEM USING ELECTROPHOTOGRAPHY

[75] Inventors: Manfred Kuehnle, New London, N.H.; Lysle D. Cahill, Dayton; John C. Butler, Centerville, both of Ohio; Lawrence J. Bassuk, Des Plaines, Ill.

[73] Assignee: Coulter Systems Corporation, Bedford, Mass.

[21] Appl. No.: 696,027

[22] Filed: Jan. 29, 1985

Related U.S. Application Data

[62] Division of Ser. No. 489,309, Apr. 28, 1983, Pat. No. 4,515,879.

[51] Int. Cl.$^4$ .................. H04N 1/04; H04N 1/40
[52] U.S. Cl. ...................... 358/285; 358/102; 358/294; 350/484; 350/6.1; 430/31
[58] Field of Search ............ 358/102, 256, 293, 294, 358/199, 206, 285; 350/6.1, 6.5, 484, 486; 430/31

[56] References Cited

U.S. PATENT DOCUMENTS

| | | | |
|---|---|---|---|
| 4,025,339 | 5/1977 | Kuehule et al. | 96/1.5 |
| 4,231,070 | 10/1980 | Pitts, Jr. | 358/285 |
| 4,415,934 | 11/1983 | Konishi | 358/294 |
| 4,493,549 | 11/1985 | Thomas et al. | 355/3 R |
| 4,503,468 | 3/1985 | Seirnken et al. | 358/256 |
| 4,523,093 | 6/1985 | Neumann | 25/234 |

Primary Examiner—James J. Groody
Assistant Examiner—John K. Peng
Attorney, Agent, or Firm—Silverman, Cass, Singer & Winburn, Ltd.

[57] ABSTRACT

An electrostatic image of binary data representing elements if formed on a particular electrophotographic member disclosed and claimed in U.S. Pat. No. 4,025,339. The electrostatic image is toned and the toned image is transferred to a storage medium. The storage medium is in the form of an extended length of dual-layer transparent synthetic resin material. One of the layers has a softening range of temperature less than the substrate. At the transfer, the one layer is heated and the toned image is pressed into the one layer. The storage medium carrying the toned image then is wound up on a storage or take-up spool while fresh medium is fed from a supply spool. The two spools are carried by a housing and the housing, spools and medium form an optical mass memory cassette. Reading of the data occurs by deflecting rays of light across the medium and the light that is transmitted through and blocked by the medium is sensed in bar sensors, one for each ray. The rays are deflected across the medium in a pattern similar to the pattern used for imaging the electrophotographic member. The electrical signals from the sensors are used to produce binary data representing the data stored on the medium.

6 Claims, 12 Drawing Figures

METHOD AND DEVICE FOR READING DIGITAL DATA IN AN OPTICAL MASS MEMORY SYSTEM USING ELECTROPHOTOGRAPHY

This is a division of application Ser. No. 489,309 filed Apr. 28, 1983, now U.S. Pat. No. 4,515,879.

BACKGROUND OF THE INVENTION

This invention relates to mass storage systems of digital data in which tremendous quantities of digital data are stored for occasional access by such as a computer or processing system. In particular, this invention relates to mass storage systems operating on optical principles for recording, storing and reading digital data in which the storage medium is formed of inexpensive resinous material and the medium carries the digital data in the form of a toned image.

Memory means that are used in modern computer or processing systems may be classified in two categories: main memory or mass memory.

Both types of memory store data digitally in the form of bits. Each bit is a binary—a logical "1" or "0"—representation of the information carried thereby. The bits are grouped into bytes and the bytes are grouped into words. The more bits that are grouped together the higher the level of intelligence that is represented.

Main memory is formed of those memory circuits that are directly accessible at the speed of the central processing unit of the computer system. It comprises RAM (random access memory) and ROM (read only memory) and it contains both the software operating instructions for and data being operated on by the central processing unit.

Main memory typically has been implemented in magnetic core and recently in semiconductor integrated circuits. It is the memory necessary for the central processing unit to function.

Mass memory is formed of those memory circuits that, as its name implies, store mass quantities of data. It stores data and software programs that are indirectly accessible by the central processing unit, i.e., the contents of mass memory usually must be transferred to the main memory for access by the central processing unit. Mass memory typically is accessed at speeds much slower than the operating speed of the processing unit and blocks of data or information are transferred from the mass memory to the main memory at one time. Mass memory contains or holds information that is only occasionally used by the computer system and for the most part is retained in storage.

Examples of the types of information stored in mass memory are billing information accessed monthly, programs to run the billing operation and personal records.

Early in the development of computer systems, mass memory was implemented with paper tape and magnetic tape. More recently, mass memory has been implemented with magnetic discs, magnetic bubbles and optical discs. The object of all mass memory systems has been and is to provide a memory system that will store the most amount of digital data with the fastest access times for the least cost. Of all the systems used to date, the optical mass memory systems present the greatest opportunities for achieving the object of mass memory systems.

Optical mass memory systems generally use a beam of radiant energy such as a laser beam to alter, physically or chemically, a layer or layers carried by a substrate. The beam typically is modulated with the digital data to be stored by turning the beam on and off in response to a serial stream of data bits. The modulated beam is directed onto the storage layer or layers where the energy of the beam is used to alter the layer or layers physically, by burning through the layer or changing its reflectivity or opacity, or chemically, by reacting the chemicals in a silver-halide photographic emulsion.

Several ways of forming the layers and altering them to form an optically readable image are known; some of these being reviewed in U.S. Pat. No. 4,343,879 to Drexler et al.

A problem with metal film layers that are burned through to record the data is that the vaporized metal must be removed to avoid affecting adjacent data. A problem with photographic emulsions is that they must be developed, usually manually, to render the image optically discernible for reading.

To date, optical mass memory systems have used a disk that is rotated and moved radially in translation to align selected areas on the disk with the modulated laser beam. Rotation and translation transducers are used to determine the alignment of the beam with various areas on the disk and all of this hardware is contained in an enclosure to exclude dust, hair, et., which has a deleterious affect on the recording and reading process. An example of such a disk recording system is disclosed in U.S. Pat. No. 4,145,758 to Drexler et al.

The system disclosed in U.S. Pat. No. 4,145,758 is indicated as being able to record and store 7200 megabits of binary data on a 12 inch disk. This is in comparison to 360 megabits of data that may be stored on a standard magnetic tape, according to that patent.

Heretofore, all of the optical mass memory systems have required the use of special and sometimes exotic or sophisticated materials to form the recording medium. This has resulted in a high cost for each recording medium or disk, but the per bit cost has been competitive because of the tremendous number of bits that can be recorded on the disk. A less expensive medium would reduce the per bit cost even further.

The system operating costs for such optical mass memory systems also has been high; mainly due to the energy of the laser required to alter the medium physically or chemically to record bits. A medium that is not physically or chemically altered to record the data bits would require a less powerful radiant energy source costing less to operate, reducing the per bit cost even further.

It is desirable to form the recording medium other than in the form of a disc that is rotated and moved in translation. A disk inherently has differing numbers of equal area recording fields lying in circular tracks nears its circumference than near it center. Further, the disk must be manufactured to be flat, etc. A recording medium in the form of a strip or tape of record medium however can provide equal numbers of recording fields in rows across its width and a number of rows along a desired length. A tape of record medium also can have a portion adjacent a reading or recording head while the opposite ends are wound up in rolls, such as in a cassette. This would provide for much greater numbers of digital data to be stored on the tape of record medium than is presently available with present disk systems and varying lengths of tapes could be presented to the recording and reading stations without changing those stations.

Input to and output from the record medium also must be maintained simple so that tremendous quantities of data bits may be transferred within a reasonable period of time.

The digital data that is referred to herein is of the type known as binary data and is in the form of electrical signals. This is the type and form of the digital data applied to and output from mass memory systems disclosed herein and is what is represented on the medium disclosed herein.

SUMMARY OF THE INVENTION

In accordance with the invention an optical mass memory system is disclosed that with existing technology is believed to be capable of recording, storing and reading data at a greater concentration than has previously been known.

The optical mass memory system comprises a recorder, an optical storage cassette carrying the storage medium, and a reader. The system operates by recording binary digital data on a storage medium using particular electrophotographic and storage medium materials and reading the recorded data with an optical technique similar to recording to re-produce the binary digital data.

The reader operates on recognized optical principles to modulate a beam of radiant energy such as from a laser to produce rays. The rays are deflected across a charged portion of the particular electrophotographic member disclosed and claimed in U.S. Pat. No. 4,025,339, in a pattern of rectilinear image lines. The rays discharge certain areas and leave charged certain areas of the portion of the member and thereby form a latent electrostatic image on the member. The electrostatic image then is toned and carried to a transfer station.

The optical storage cassette is loaded into the reader with the storage medium being located adjacent the electrophotographic member. The storage medium is formed of a length of dual-layer, transparent synthetic resin material extending from a feed spool to a take-up spool. The portion of the medium between the spools is in contact with the member at the transfer station. The substrate of the medium carries a coating that preferentially may be softened relative to the substrate at a temperature range lower than the softening range of the substrate. At the transfer station, the medium is heated to the softening range of the coating and is urged under pressure against the toned image carrying member. This transfers the toned image from the member and embeds it in the coating of the medium. The resolution of the toned image is maintained.

The portion of the medium carrying the toned image is advanced to and wound upon the take-up spool while fresh medium is supplied from the feed spool. The portion of the member from which the toned image is transferred is cleaned, charged and returned for re-imaging. When the length of medium is loaded with toned image the cassette is removed and a fresh cassette is inserted in its place.

Reading of the data occurs by directing reading rays of light onto the portion of the medium extending between the spools. The rays are deflected across the medium in a pattern the same as the pattern of lines used for imaging the member. The light energy passing through the transparent areas of the medium not carrying toner is sensed by bar sensors extending the width of the medium, one sensor per ray. The electrical signals from the sensors are used to recreate the binary digital data presented to the recorder and represented on the medium.

The particular electrophotographic member material provides for a resolution of data representing elements that is finer than previously has been available for electrostatic materials such as are used in xerography. Thus, the member is imaged with smaller area elements than previously has been thought possible.

The particular storage medium provides a transfer of toner particles from the member to the medium with a retention of resolution of elements better than previously thought possible.

The use of these two materials achieves an optical mass memory system with the capability of storing more data on less area than has been possible.

DESCRIPTION OF THE PREFERRED EMBODIMENT

Figure 1:
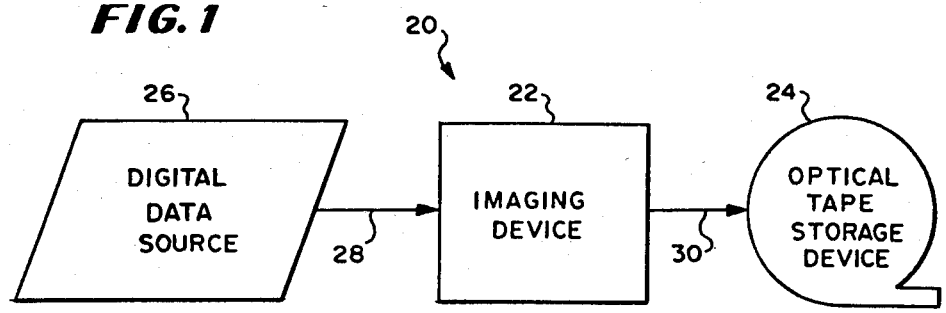
FIG. 1 is a schematic diagram of an optical mass memory system illustrating the recording and storage devices of the invention.

The invention herein best will be understood by considering that the invention involves three inter-related functions, namely: recording, storing and reading of digital data. Recording involves placing the digital data on the storage or record medium; storing involves the quiescent retention of the digital data on the medium for desired periods which may be archival in nature, and reading involves the production of useful electrical signals in response to the digital data stored on the medium. Effecting all three functions revolves around the particular materials selected for recording and the storage medium.

Recording occurs by using the digital data electrostatically to image an electrophotographic member formed of a particular material The latent electrostatic image so formed is toned and the resulting toned image is transferred to a record medium in the form of an elongate tape of a particular, resinous material. The member and the tape are moved at the same rate at the place of transfer with the member being returned for further imaging. The tape is supplied from a spool and is taken-up on a spool.

Imaging occurs by modulating a beam of radiant energy from a laser into rays of radiant energy in response to the digital data, the binary sense of the data being represented by the rays. The rays are directed onto and are deflected across a line of the electrophotographic member.

The member is in the form of a drum carrying a sleeve of coatings, one of which is the electrophotographic material described and claimed in U.S. Pat. No. 4,025,339 to Kuehnle. That material comprises a thin film coating of a photoconductive material less than 1 micron in thickness that is very dense, wholly inorganic and microcrystalline, the crystals of said coating being generally uniformly oriented vertically relative to the surface of the substrate means, substantially free of effective barrier layers between the crystals, the coating having light transmissivity of at least 70 percent, having dark resistivity of at least $10^{12}$ ohm-centimeters and a ratio between dark and light resistivity of at least about $10^4$ and being electrically anistropic whereby the coating is capable of accepting a rapid charge and retaining same sufficient to enable toning.

The drum is rotated, step by step or continuously to present freshly charged portions to the line being imaged by the modulated beam. The latent electrostatic image so formed is carried by the rotating drum to a toning station where the latent image is rendered optically recognizable by the toner particles. The toned image then is carried to a transfer station.

At the transfer station the fresh portions of the tape are heated and urged against the member to embed the toner particles in the top side surface thereof. The tape then is peeled off the member. The portion of the member from which the toned image is removed is cleaned and charged and re-presented to the imaging line. The tape is advanced and fresh portions are presented to the transfer station, while the portions carrying the toned image are moved to the take-up spool.

The tape is the transfer medium disclosed and claimed in application Ser. No. 317,445, now U.S. Pat. No. 4,529,650, filed Nov. 2, 1981. That medium comprises a transparent substrate and a thin transparent coating bonded to one surface of the substrate. The thin coating is formed of a resinous material compatible structurally with the substrate and having a softening range lower than the substrate, the coating being preferentially softened relative to the substrate.

The disclosure of the referenced patent application indicates that the transfer medium is used advantageously in the analog fields of copying such as microcopiers and microfiche. In those fields, entire original images are reproduced, essentially at one time. The use contemplated by the present application is in the digital field of mass storage, where the data substantially is recorded and read serially, one bit or word at a time.

The information or data so recorded on the tape is stored indefinitely in the housing carrying the feed and take-up spools. The data so carried need not be "refreshed" after a period and is not affected by magnetic fields. The data stored is highly stable, the only apparent failure mode being the physical destruction of the storage medium material and that will occur only under unusual conditions.

Reading occurs by optically recognizing the data carried by the tape and producing electrical signals therefrom. A beam or beams of radiant energy are directed onto the tape along and across lines corresponding to the lines at which the data was recorded. The radiant energy that passes through the tape is collected and sensed and is used to produce the output electrical signals.

The particular electrophotographic material and tape material provide, respectively, for finer images to be formed, and better maintenance of the image quality through transfer and during storage, than previously has been available. Thus, more digital data and better quality digital data can be recorded, stored and read from a certain area of storage medium than previously has been possible.

Turning now to FIG. 1 there is illustrated a recording apparatus of the invention indicated generally by the reference character 20. This apparatus 20 comprises an imaging device 22 and an optical tape storage device 24. The recording apparatus 20 is supplied digital data from a source 26 across lines 28. The transfer of the digital data from the imaging device 22 to a storing device 24 is indicated by a line 30. The digital data is stored in storage device 24 for an indefinite period.

Figure 2:
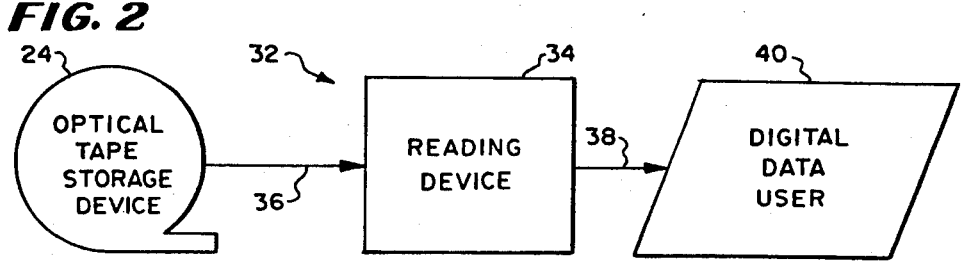
FIG. 2 is a schematic diagram of an optical mass memory system illustrating the storage and reading devices of this invention.

In FIG. 2 there is illustrated a reading apparatus of the invention indicated generally by the reference character 32. The reading apparatus 32 comprises the optical tape storage device 24 and a reading device 34. Transfer of the digital data from storage device 24 to reading device 34 is indicated by line 36. The digital data output from reading device 34 is transferred across lines 38 to a digital data user 40.

Figure 3:
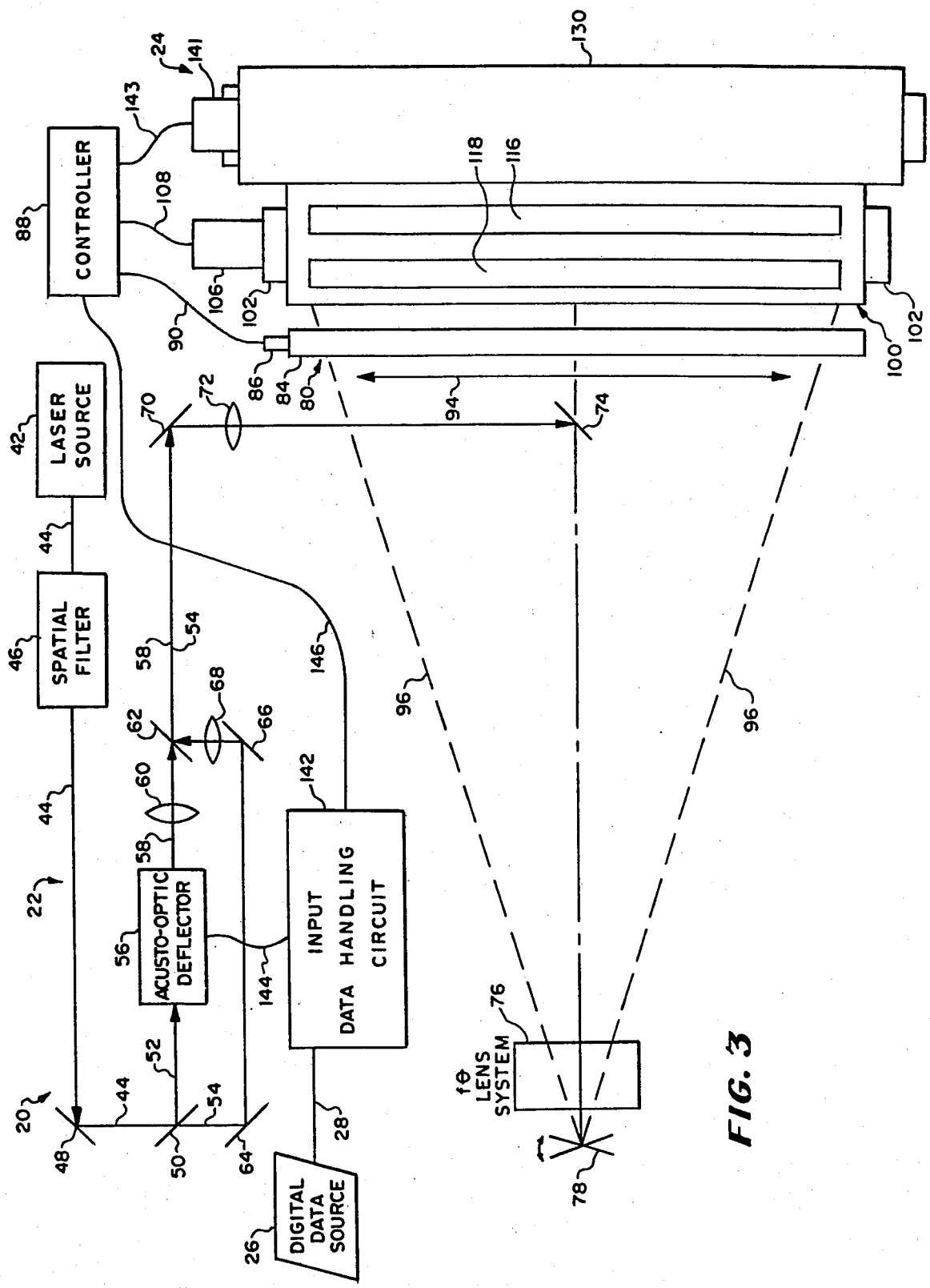
FIG. 3 is a schematic diagram in plan view of the recording and storage devices of the optical mass system of the invention.
Figure 4:
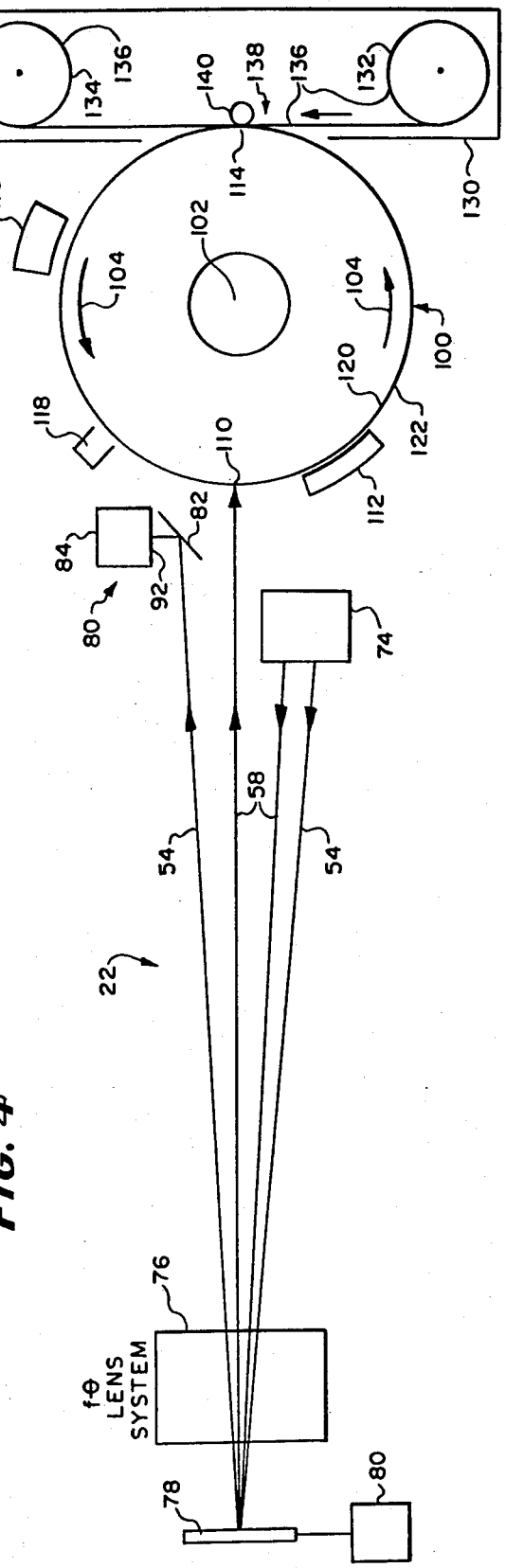
FIG. 4 is a schematic diagram in side elevation view of the recording and storage devices of FIG. 3.

In FIGS. 3 and 4, the imaging device 22 is illustrated centrally of the drawing figures, while the storage device 24 is indicated at the right-hand side of the drawing figures. Digital data source 26 is illustrated at the left-hand side of FIG. 3.

Imaging device 22 comprises a laser source 42 providing a beam 44 of radiant energy in the form of a laser beam. Beam 44 passes through a spatial filter 46 and is directed onto a bending mirror 48. Thereafter, beam 44 is directed onto a half-silvered mirror 50, which splits beam 44 in two approximately equal density beams 52 and 54. Beam 52 is directed through acousto-optic deflector 56, which modulates the beam 52 and outputs a fine beam 58 of rays. Fine beam 58 exits the deflector 56, passes through imaging lens 50 and passes above deflecting mirror 62. Beam 54, being that radiant energy passing through half-silvered mirror 50, is directed onto bending mirrors 64 and 66, passes through imaging lens 68 and is directed by bending mirror 62 into vertical alignment directly below fine beam 58. Thereafter, fine beam 58 and beam 54 retain their vertical alignment, one with the other. Beams 54 and 58 then are directed by bending mirror 70 through a secondary imaging lens 72 to bending mirror 74 and then through $f\theta$ lens system 76 to galvanometer mirror 78. Galvanometer mirror is rotated by a galvanometer 80 to deflect the beams 54 and 58, respectively, across a horizontal plane. The vertical disposition of the beams 54 and 58 is illustrated in FIG. 4. Beams 54 and 58 are reflected from galvanometer mirror 78 back a second time through the $f\theta$ lens system 76.

Galvanometer mirror 78 sweeps both beams 54 and 58 in a direction indicated by arrow 94 in FIG. 3 and to outer limits indicated by dashed lines 96.

Beam 54 then is directed onto a position sensor 80 comprising a folding mirror 82 and a bar collector 84. At one end of bar collector 84 is a photodetector 86 which sends electrical signals to controller 88 over leads 90. A grating 92 is located between folding mirror 82 and bar collector 84, through which beam 54 must pass before entering the bar collector 84. Grating 92 provides an alternating sequence of opaque and transparent areas. Thus, a pulsed signal appears on leads 90 as galvanometer mirror 78 sweeps the beam 54 across the length of position sensor 80, the pulses occurring in response to the beam 54 alternatively being blocked and passing through the grating 92 to photoelectric sensor 86.

The signals on leads 90 are used by controller 88 to sense the position of beam 54 and, due to the vertical alignment of beams 54 and 58, the signals on leads 90 indicate the position of fine beam 58 that is to be used for imaging. Knowing the position of beam 58 provides for the proper positioning on the electrophotographic member of the digital data from source 26.

The imaging device 22 further comprises an electrophotographic member 100 that is mounted on bearings 102 for rotation around its longitudinal axis. Rotation of member 100 occurs in the direction inidcated by arrows 104, and it is driven in this direction by stepping motor 106 under control of controller 88 through leads 108. Fine beam 58 is deflected across the exterior surface of member 100 by galvanometer mirror 78 across a planar image line 110. A toning station 112, a transfer station 114, a cleaning station 116 and a charging station 118 are arranged in counter-clockwise sequence around the exterior surface of member 100, the toning station 112 being positioned counter-clockwise from image line 110 and charging station 118 being positioned clock-wise from imaging line 110.

Figure 11:
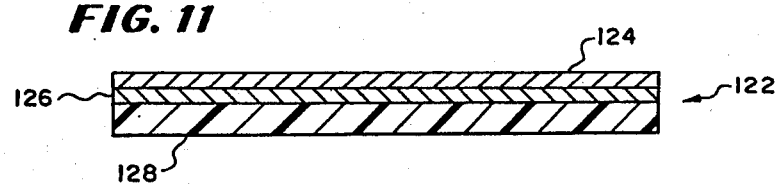
FIG. 11 is a sectional view through the sleeve carried by the electrophotographic member.

Electrophotographic member 110 comprises a drum 120 carrying on its exterior surface a sleeve 122 of the electrophotographic film disclosed and claimed in U.S. Pat. No. 4,025,339 to Kuehnle, incorporationed herein by reference. Sleeve 122 comprises an endless loop represented in cross-section in FIG. 11. Sleeve 122 is formed of a thin film coating 124 of photoconductive material, an ohmic or conductive thin film layer 126 and a substrate 128. These three layers are described at length in the referenced patent so that a restatement of their characteristics and qualities here would be repetitious. It suffices to say that the coating 124 of photoconductive material is less than one micron in thickness, is very dense, wholly inorganic and microcrystalline, the crystals of the coating are generally uniformly oriented vertically relative to the surface of the substrate 128 and are substantially free of effective barrier layers between the crystals. The coating 124 has a light transmissivity of at least 70 percent, has a dark resistivity of at least $10^{12}$ ohm-centimeters and a ratio between dark and light resistivity of at least $10^4$ and is electrically anisotropic. The coating thus is capable of accepting a rapid charge and retaining same sufficient to enable toning.

The material of the coating 124 provides for electrostatic imaging that is finer than can be obtained with previously known photoconductive materials, i.e., much smaller areas of film 124 can be electrostatically imaged and hold their charge without migration than was previously available.

Referring again to FIGS. 3 and 4, optical tape storage device 24 comprises a housing 130 enclosing a feedspool 132 and a take-up spool 134 of storage or record medium 136, there being a planar portion 138 of the medium 136 extending between the feed and take-up spools 132, 134. Housing 130 further includes transfer means in the form of a heated roller 140 positioned median of portion 138 at the transfer station 114. The medium 136 is moved from spool 132 to spool 134 and back again, if necessary, by drive means 141 under control of controller 88 across leads 143. Drive means 141 may be carried by housing 130 or may be separate therefrom.

Figure 12:
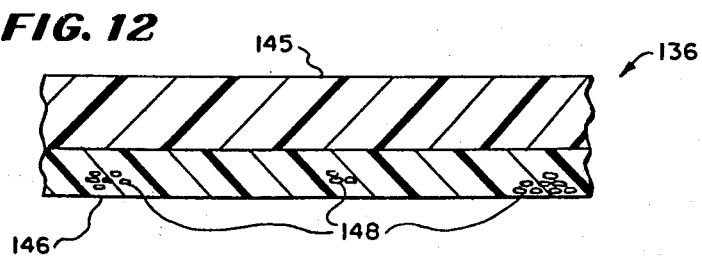
FIG. 12 is a sectional view of a portion of the storage or record medium.

Storage medium 136 is the image transfer material described and claimed in U.S. patent application Ser. No. 317,445 filed 11/2/81, now U.S. Pat. No. 4,529,650. Referring to FIG. 12, storage medium 136 comprises a polyester plastic substrate 145 having a thin transparent coating 146 of a compatible polyester resinous composition having a softening range less than the softening range of the substrate material. Toner particles 148 are embedded in the coating 146; the placement and area, and the presence and absence of the toner particles representing the digital data in the storage medium 136. A more complete description of medium 136 will be made presently.

Recording device 22 further comprises input data handling circuit 142 that receives the digital data from source 26 over lines 28 and produces modulating signals on lines 144 in timed relationship with the movement of electrophotographic member 100 and the deflection or sweep of beams 54 and 58. The information concerning the rotation of member 100 and the deflection of beams 54 and 58 is conveyed from controller 88 to circuit 142 over lines 146. The description of the input data handling circuit 142 and the laying down of an electrostatic image representing the digital data on member 100 will be presented after a description of the operation of the imaging and transfer functions.

Referring, in particular, to FIG. 4, beam 58 is swept across successive linear surface portions of member 100 at imaging line 110 as member 100 is rotated. The portions of the surface area of member 100 approaching the image line 110 have been charged to the desired electrostatic voltage potential at charging station 118. The electrostatic image is formed by fine beam 58 at image line 110 by selectively discharging certain areas and leaving other areas charged. This latent electrostatic image then is developed by toning at toning station 112. Particles of toner are attracted to the areas that remain charged while no toner particles are attracted to the areas that are discharged. The toner particles are substantially smaller than the areas that remain charged and the areas that have been discharged so that a good development of the electrostatic image is obtained. Toning the charged areas is known as "positive" toning. Alternatively, toners can be used that apply the toner particles to the uncharged areas while the charged areas repel the toner particles to effect negative toning.

Portions of the surface area of member 100 that pass through toning station 112 and that have been electrostatically imaged thus carry a toned image that is optically recognizable, the toner particles being optically recognizable. The toned image is carried around the bottom of member 100 to transfer station 114 where only the toner particles are transferred to the storage medium 136. Storage medium 136 is moving tangentially to member 100 at the same velocity that the circumference of member 100 is moving. Thus, at transfer station 114 there is no relative movement between the member 100 and record medium 136.

The transfer of toner particles 148 is effected by heating the medium 136 preferentially to soften only the coating 146 while the substrate 145 retains its dimensional stability. Medium 136 then is urged against member 100 under pressure to embed the toner particles 148 in the softened coating 146 (See FIG. 12). The medium 136 then is peeled or stripped from member 100 and continues on to take-up spool 134. The heating and urging of the medium 136 against the exterior surface of member 100 is performed by roller 140. Other means are available to perform this heating and urging. As the toner particles 148 are transferred from member 100 to medium 136, the portions of member 100 from which the toned image has been removed continue on past cleaning station 116 to charging station 118 and image line 110 for re-imaging. As newly imaged portions of member 100 are brought to the transfer station 114, the toned images they carry are transferred onto portions of the storage medium 136 as it moves through transfer station 114 from feed spool 132 to take-up spool 134.

This arrangement uses to advantage the fine imaging capabilities of the photoconductive coating 124 of sleeve 122 in a relatively inexpensive imaging apparatus to obtain the advantage of storing the digital data in the form of a toned image on a storage medium 136 that is readily available and extremely inexpensive. The invention holds great promise not only in the use of inexpensive materials and widely understood imaging techniques to storage vast amounts of data, but also that digital data can be recorded at a high rate limited only by the modulation capabilities of the acousto-optic deflector 56 and the deflection rate of the galvanometer mirror 78. Parallel processing can multiply the rate at which the data is imaged on member 100.

After the length of storage medium 136 is exhausted, the entire optical tape storage device 24 may be removed from the recording devive 22 and be replaced by a blank storage device 24.

The storage device 24 and storage medium 136 are exceptionally stable. They are unaffected by electric or magnetic fields, light and harsh chemicals. It appears that only the application of heat to a level beyond that used at transfer station 114 and the use of chemical solvents will have deleterious affects on storage device 24 and medium 136. Their use for archival storage of data, thus, is ideal.

In effect, storage device 24 may be thought of as an optical tape cassette.

The operation of input data handling circuit 142 will best be understood by considering that ten parallel rows of image elements are formed along each image line 110 effected on member 100. These ten rows are effected by the possibility of ten vertically aligned rays that constitute fine beam 58 produced by acousto-optic deflector 56. The formation of these ten rays is controlled in turn by ten parallel bits of information that are applied to the acousto-optic deflector 56. Digital data source 26 provides a stream of 8-bit serial words that are transformed to 8-bit parallel words in circuit 142. Two additional parallel bits are produced by controller 88 and are carried to circuit 142 over leads 146. The purpose of these two additional parallel bit streams from controller 88 is to aid in effecting reading of the digital data from the storage medium 136. There are a plurality of steps or columns along the rows of each image line, with the eight bits of digital data carried by each word from source 26 being used to form elements on member 110 at each column.

Figure 5:
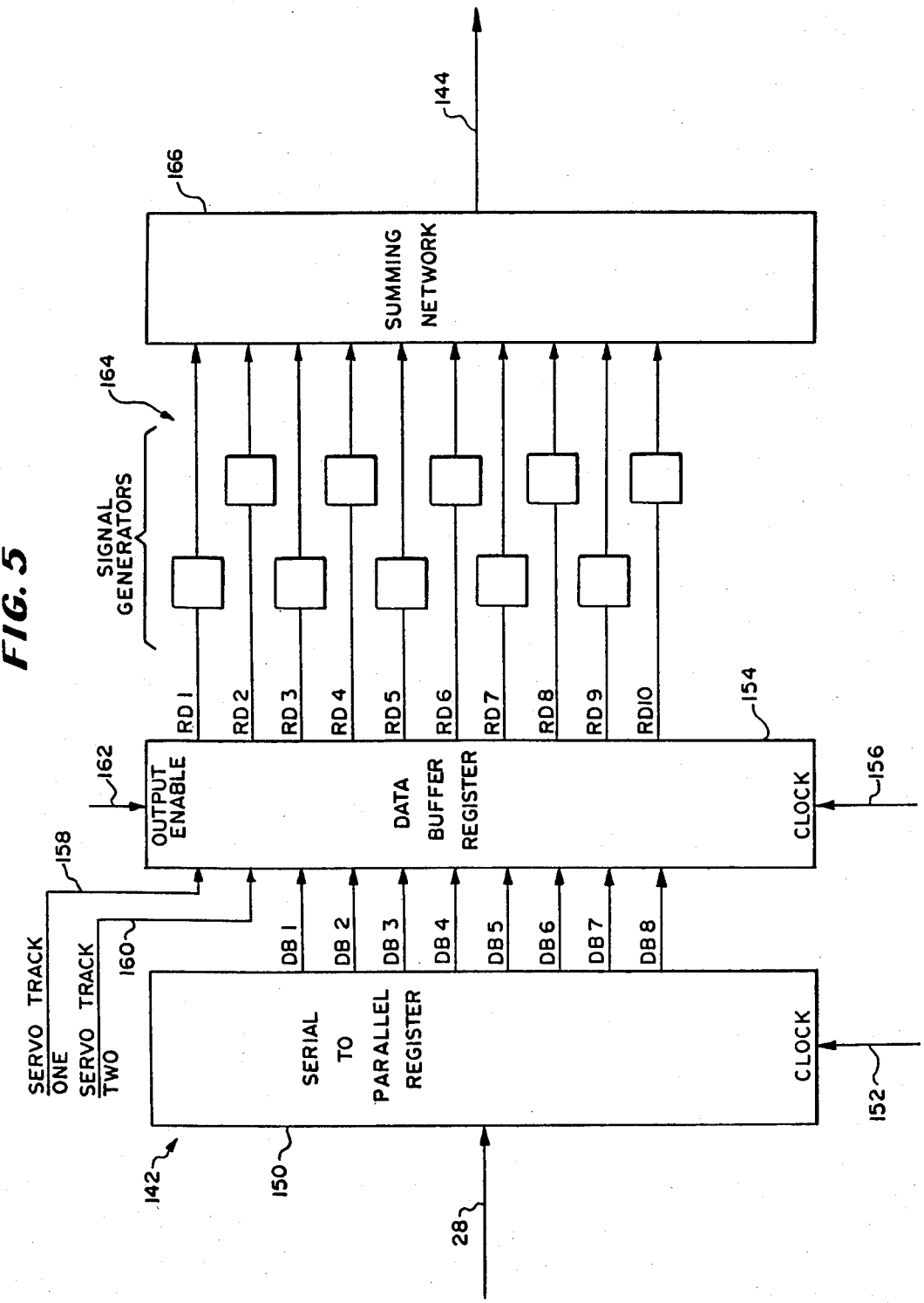
FIG. 5 is a schematic diagram of the input data handling electronics of the recording device of FIGS. 3 and 4.

Turning now to FIG. 5, input data handling circuit 142 comprises a serial to parallel register 150 receiving the eight bit serial data words on leads 128. These words are clocked into register 150 by way of clock signals appearing on lead 152. The serial bits of each data words are transformed to parallel format and are output at DB1-DB8, at each clock signal on lead 152. The data words then are clocked into data buffer register 154 by way of a clock signal appearing on lead 156. The information or sequential bits appearing on servo-track one, lead 158, and servo track two, lead 160, also are clocked into register 154 upon occurrence of the clock signal on lead 156. The data that is buffered in register 154 is output therefrom on the occurrence of an ouptut enable signal on lead 162. The outputs of register 154 are identified as ray data signals RD1-RD10. Each of the ray data signals are binary bits that are applied to the signal generators 164, there being one signal generator for each ray data bit.

The sense of the ray data bits determine whether the signal generators produces a certain unique high freqnecy signal that is output to summing network 166, and then carried on leads 144 to the acousto-optic deflector 56. The frequencies of the signal generators 164 are selected so that the signal output by each signal generator 164 is able to produce in the deflector 56, one ray in the fine beam 58 of rays. The sense of the binary data bits output from register 154 thus determines whether a particular ray will be formed or will not be formed at a certain point of time. Through the use of the timing information from controller 88, which is applied to the input data handling circuit 142 as the clock signals on leads 152 and 156 and the output enable signal on lead 162, an image will be formed at the proper columns along the rows and image lines imaged on member 100.

Figure 6:
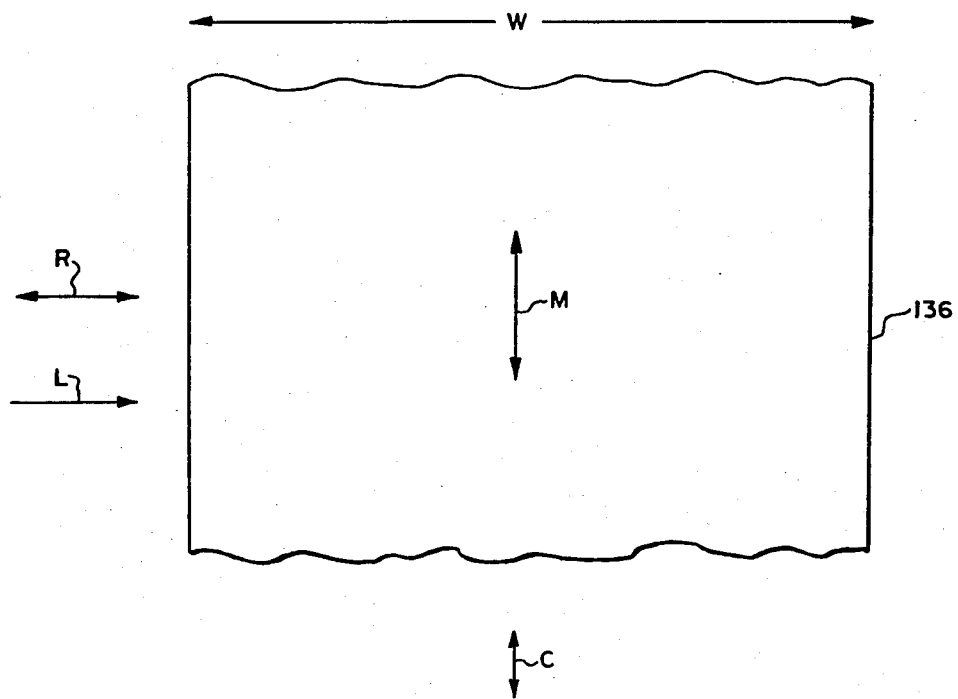
FIG. 6 is a diagram in plan view of a portion of the optical tape storage medium of the invention.
Figure 7:
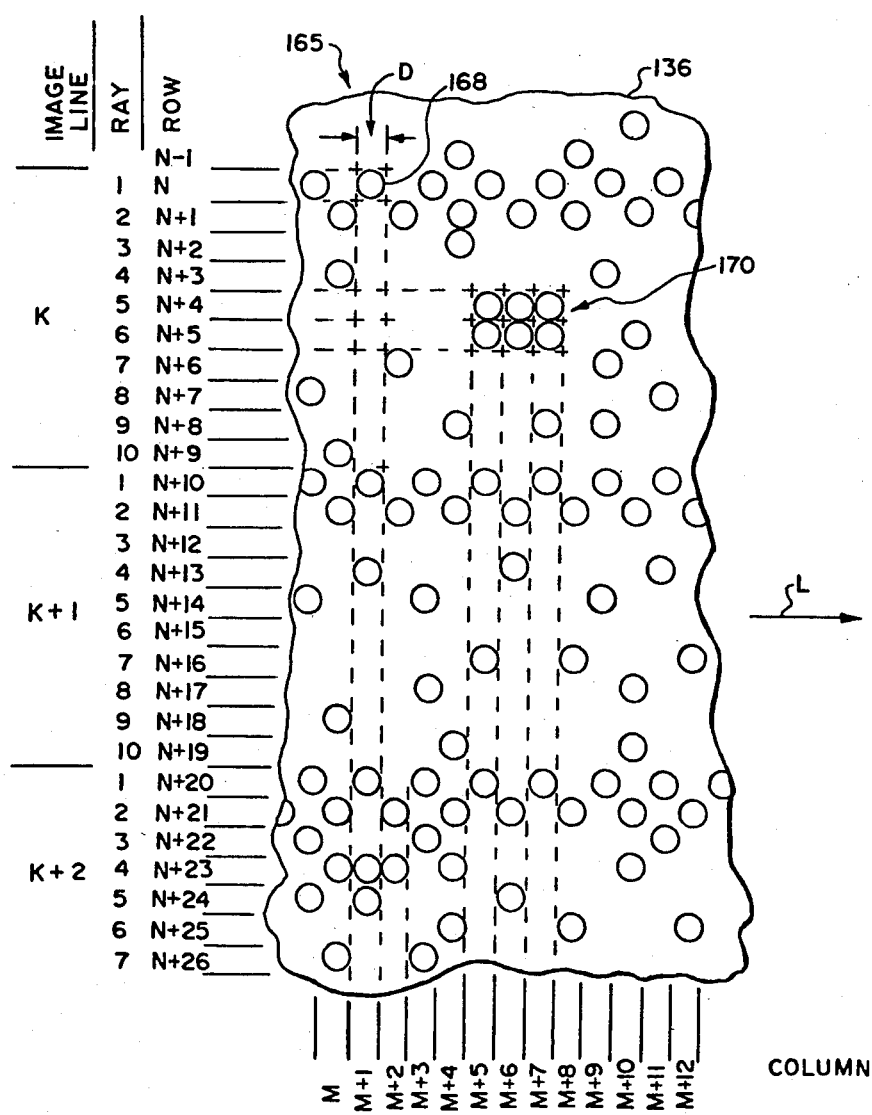
FIG. 7 is a diagram, greatly enlarged, of a field of binary elements formed on a portion of the surface of the optical tape.

Referring to FIGS. 6 and 7, although imaging occurs on member 100, the toned image created is effectively one hundred percent transferred to the storage medium 136, so that it is accurate to discuss the pattern of the imaging with reference to the image carried on storage medium 136. In FIG. 6, the storage medium 136 is indicated as having a width (W) and is moved in a direction indicated by the arrow (M). The imaging lines are formed transverse of the length of storage medium 136 in a direction indicated by arrow (L) with the rows lying along the direction indicated by arrow (R). The steps or columns of the image along the rows so formed lie along the direction indicated by arrow (C).

In FIG. 7, a field 165 of a plurality of circular image elements such as 166 are formed on the storage medium 136. In positive toning, these circular elements or imaged elements will be clear or transparent on a toned or opaque background. In negative toning, these circular elements will be toned or opaque in a clear field. Each image line K, K+1, K+2 is indicated as having ten rows. Each row is imaged by one of the ten rays, the ten rays being swept together across an image line in the direction indicated by the arrow L.

Each imaged element has a diameter "D" indicated at element 168 that is the width of a column so that each imaged element will be entirely contained within the image area indicated by its row and column position. There is no overlap of the elements into adjacent rows and columns. This is indicated at group 170 of the elements where there are six elements arranged or located immediately adjacent one another, there being no overlapping of the elements one on the other. The position of the group 168 of elements is identified by rows N+4, N+5, and columns M+5, M+6 and M+7. The dashed lines indicated in FIG. 7 are for exploratory purposes and do not exist upon the exterior surface of member 100 or on the surface of storage medium 136.

The image elements formed by rays 1 and 2 along each image line effect an alternating pattern of imaged and non-imaged areas. These patterns are used during the reading operation to aid in recovery of the data from medium 136. The first two rows of every image line are provided with this alternating image pattern. The image elements formed by rays 3 through 10 represent the digital data from source 26; in FIG. 7, these elements are not intended to represent any particular information and are drawn for illustrative purposes only.

The image elements formed along each column and, in particular, at the bottom eight rows of the image line represent the digital data contained in one 8-bit word presented to the data handling circuit 142 over leads 28. Thus, bits 1-8 of a data word will be represented by the image elements at such as image line K1 column M+3, rows N+12 through N+19, respectively. Field 165 represents a microscopic portion of the available image areas provided by medium 136, with the imaging pattern illustrated here being illustrative of the imaging patterns that are formed along the length and width of medium 136.

The storage medium 136 used in the invention is adapted particularly to receive toned latent images fromed upon an electrophotographic member of the type disclosed in U.S. Pat. No. 4,025,339.

The photoconductive coating 124 carried by the patented electrophotographic member consists of uniformly vertically oriented microcrystals to form a dense, abrasion resistant layer bonded to the ohmic layer earlier deposited on the substrate. The photoconductive layer possesses unique optical and electrical properties, notably optical and electrical anisotropy, that enables the coating to be electrically charged rapidly and to hold the charge sufficiently to enable toning subsequent to exposure to an image pattern of the subjected matter to be reproduced.

An electrostatic latent image of the subject matter to be reproduced is formed on the surface of the electrophotographic member and is made visible by toning. The characteristics of the coating enable unusually high resolution to be achieved, and hence, provide for the unusually dense imaging of digital data in the optical mass memory field. Transfer from the unique image carrier to a film material is desired for storage. It is highly advantageous that the electrophotographic member itself solely be used for imaging rather than also functioning as the storage medium 136. Thus, it is necessary to provide a storage medium for receiving the toned image and that can constitute a permanent record.

Another reason for desiring that the record be made permanent upon a transfer medium rather than fusing the toned image to the electrophotographic member is that the member has a characteristic color which though transparent, detracts from the end-product. To take advantage of the unusual and superior resolution properties of the member, the storage medium must be capable of receiving the toned image without loss of resolution and without loss of optical density. Further, for the transfer to be effected with full benefit of the imaging process, the storage medium must accept all of the toned image without leaving any toner residue on the member. The formation of pin holes or voids in the image also must be avoided. The storage medium disclosed herein exhibits all of these desired and required characteristics.

Polyester substrate materials are preferred although other substrate materials are suitable, such as cellulose acetate, cellulose triacetate and cellulose acetate butyrate.

The preferred resins employed for the overcoating are thermoplastic polyester compositions, the chemical structures of which are similar to that of the preferred substrate manufacture and sold under the trademark MYLAR by the DuPont Company.

The resins in organic solvent solutions are applied to the polyester substrate using conventional coating methods, such as reverse roll type or Meyer rod methods (employing a wire wound rod)

Suitable resins have softening point ranges from a low of 90° C. to a high of 155° C. Suitable resins cannot have a tendecy to adhere subsequently to other coated sheets, that is, form a block say after coating is completed.

The solvents employed preferably have low toxicity characteristics. A combination of cellosolve acetate and cyclohexanone or methyl ethyl ketone and toluene can be employed as solvents. For the resin which has a softening point of about 127° C., a solution having a solids content of 7 to 10 percent by weight has been successfully employed. Where the softening ranges of the resin are in the 150° C. range, a solution having 10 to 15 percent by weight solids content in a solvent mixture of methylethyl ketone and toluene can be employed with satisfactory result. A solids content greater than 25% result in striated patterns formed in the coating and is unsatisfactory.

The coatings of the lower softening range have a thickness between 2 to 8 microns, with 6–10 microns giving the best result. The thickness of resin coatings in the upper end of the applicable softening range, is about the same. The higher softening range resins are used generally with solvent mixtures such as Methyl Ethyl Ketone 20 parts and Toluene 80 parts.

Nonfusible toners are preferred but color toners and self-fusible toners can be utilized.

It is important to recognize that the resin is selected so as to enable the toner particles to be embedded within the resin coating. Image transfer to the storage medium is effected by heating the storage medium, bringing the heated storage medium over the toned image and simultaneously applying pressure to both the member and the superimposed storage medium. The temperature to which the heated roller 140 is raised for heating the storage medium is about 140° C. The temperature at which transfer occurs is between 127° C. and 155° C. at the coating. Transfer attempts at lower temperatures may result in incomplete transfer and/or a remainent ghost image on the master sheet from which transfer is made. The preferred temperature is 140° C.

After heat and pressure have been applied, the member and storage medium are separated, by peeling or pulling the same apart. It has been found that no elevated toner image is formed on the storage medium but that the toner image has become embedded within the coating with no relief pattern being observed. The result is a high gloss, high resolution transparency.

EXAMPLE I

An electrophotographic member 122 comprising a polyester plastic substrate to which has been applied a thin layer of ohmic layer and an r.f. sputtered overly coating of photoconductive material in accordance with the teachings of U.S. Pat. No. 4,025,339 is charged with a negative corona, exposed to an original document and then toned with a nonfusible toner.

A tape or substrate such as 145 (FIG. 12) of 5 mil polyethylene glycol terephthalate plastic sheeting (conventionally heat stabilized Mylar Type M654) is coated with a 6–8 micron thick (in dry state) coating 146 of a thermoplastic polyester resin (No. 46950 are No. 49000, sold by DuPont Company, Wilmington, Del.) similar to Mylar from a 1, 1, 2 trichloroethane solution or a solvent mixture such as cellosolve acetate (1 part) a cyclohexanone (1 part) respectively, thereof having concentration of 10 percent solids and the solvent evaporated, to form the storage medium of the invention.

Similarly, coating solutions comprised of individual theremoplastic polyester resins (Vitel PE-200, PE-207, PE-222, VPE-4583A and VPE-5545A sold by The Goodyear Tire and Rubber Company, Akron, Ohio), or combinations thereof, having a concentration of 15 percent solids, are satisfactory alternatives for preparation of the transfer member of the invention.

As is illustrated in FIG. 4 at transfer station 114, the toned member 136 is brought together with the coating 146 side of storage medium 136 at a nip between the heated roller 140 and the drum 120 of member 100, the nip defining a narrow transverse band, In lieu of or in addition to a heated roller, one may apply a stream of hot air at the nip to heat the local area. Pressure is exerted simultaneously with the heating at the nip to no more than 170° C. (preferably 140°–150° C.). The critical lower temperature is just above the flow point of the resin coating. The critical higher temperature is below the softening range of the substrate. The drum 120 can be formed of a hard rubber having about an 80 durometer hardness. The member and storage medium are laminated at the nip, and immediately thereafter, the laminate is cooled at least to ambient temperature (perhaps lower). The laminate is then separated by peeling, i.e. pulling the member from the storage medium. The result is a transparency formed of the resin coated transparent substrate 145 carrying the toner particles 148 of the image actually embedded in the resin coating 146 to define a flat image. The high gloss medium 136 has better than 80 percent light transmission.

The transfer temperature is 135°–140° C. with a transfer speed of approximately 3 inches per second. A pressure of 60 pounds per square inch is applied.

Reading device 34 best will be understood by considering that a plurality of radiant energy reading rays, equal in number to the number of imaging rays used to record the digital data on the storage device 24, are produced and are deflected across a plane to define a reading line. The rays are continuously formed, i.e. they are not turned off at selected positions across the reading line. The storage device 34 is arranged or positioned so that the reading line is coincident with the image lines of digital data that have been formed in the storage medium 136. The portions of the rays that pass through the storage medium 136 at the imaged elements such as 166 in FIG. 7 are sensed and are used to produce electrical signals representing the digital data stored on the medium 136. The alternating pattern of image elements occurring in the first two rows of the image lines are used to move a glass plate, through which the rays must pass, around a pivot better to align the reading rays with the rows of data carried on medium 136.

Figure 8:
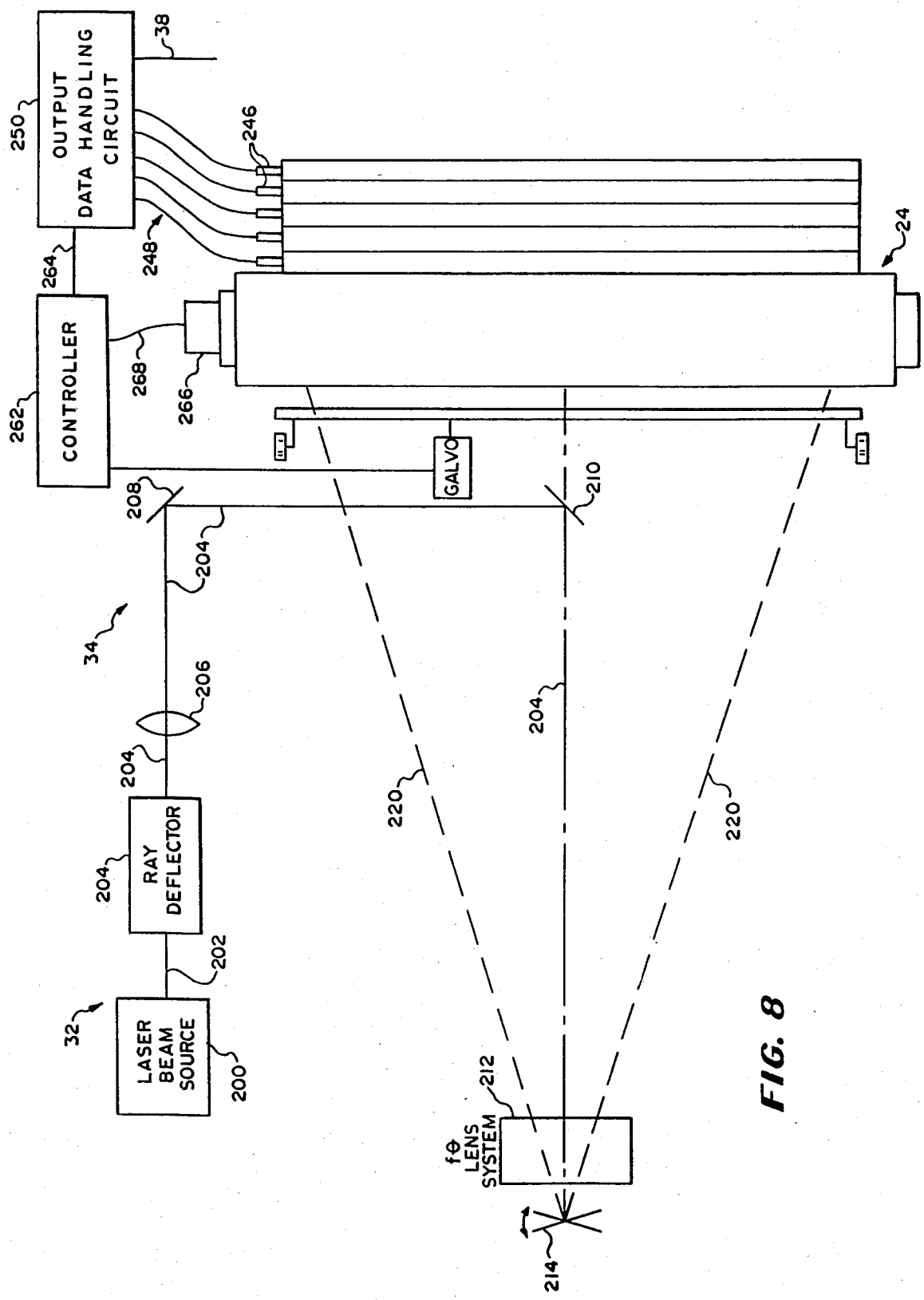
FIG. 8 is a schematic diagram in plan view of the storage and reading devices of the optical memory system of the invention.
Figure 9:
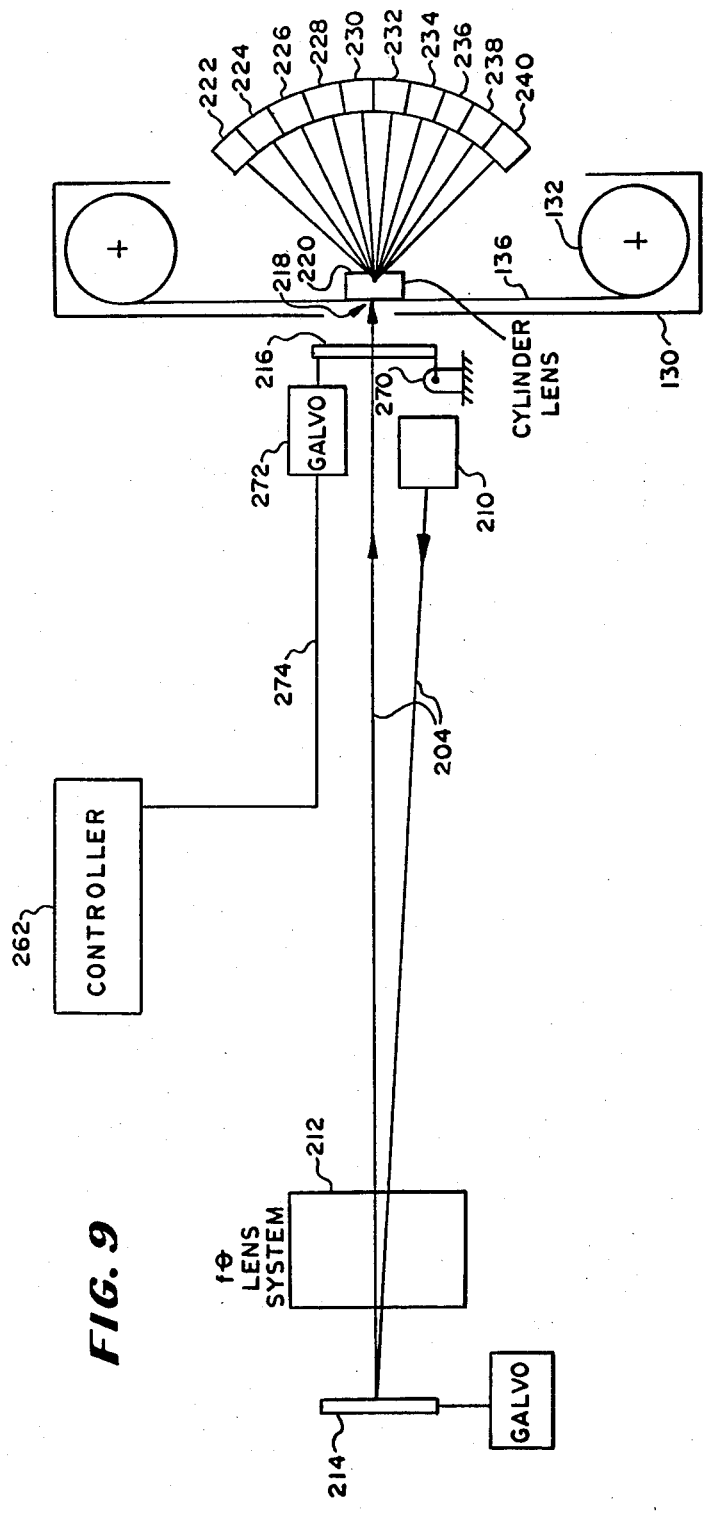
FIG. 9 is a schematic diagram in side elevation view of the storage and reading devices of FIG. 8.

Turning now to FIGS. 8 and 9, reading apparatus 32 comprises reading device 34 and storage device 24. Reading device 34 comprises a laser beam source 200 providing a beam of radiant energy such as a laser beam 202. Beam 202 passes through ray deflector 204 which is constantly or continuously forming a beam 204 comprised of 10 vertically oriented reading rays of radiant energy that are dimensioned to have a configuration and a cross-sectional area at medium 136 which is slightly less than the anticipated configuration and area of the imaged elements such as 166. Beam 204 passes through imaging lens 206 and is deflected by bending mirrors 208 and 210 through $f\theta$ lens system 212 to galvanometer mirror 214. As also is shown in FIG. 9, beam 204 thereafter passes again through $f\theta$ lens system 212 and through glass plate 216 to reading line 218. The extent to which beam 204 is deflected by galvanometer mirror 214 is indicated by dashed lines 220 in FIG. 8. The dimension bounded by dashed lines 220 at the medium 136 is slightly wider than the width of the digital data carried on medium 136.

At reading line 218, the rays of beam 204 are applied to the storage medium 136. The opaque areas of medium 136 reflect or absorb the energy of the rays while the transparent areas transmit the energy of the rays therethrough. The transmitted rays are refracted by cylinder lens 220 to bar sensors 222–240, there being one bar sensor for each ray.

The bar sensors 222–240 are elongate, extending the width W of the medium 136 and have photoelectric sensors 246 located at one end thereof for converting any light energy entering the bar sensor to an electrical signal. The electrical signals from sensors 246 are carried by leads 248 to output data handling circuit 250. The amplitude of the signals carried on leads 248 will be of two states, one for energy received in the bar sensor and another for no energy received. The duration of the signals will represent the duration that energy is received in the bar sensor.

Figure 10:
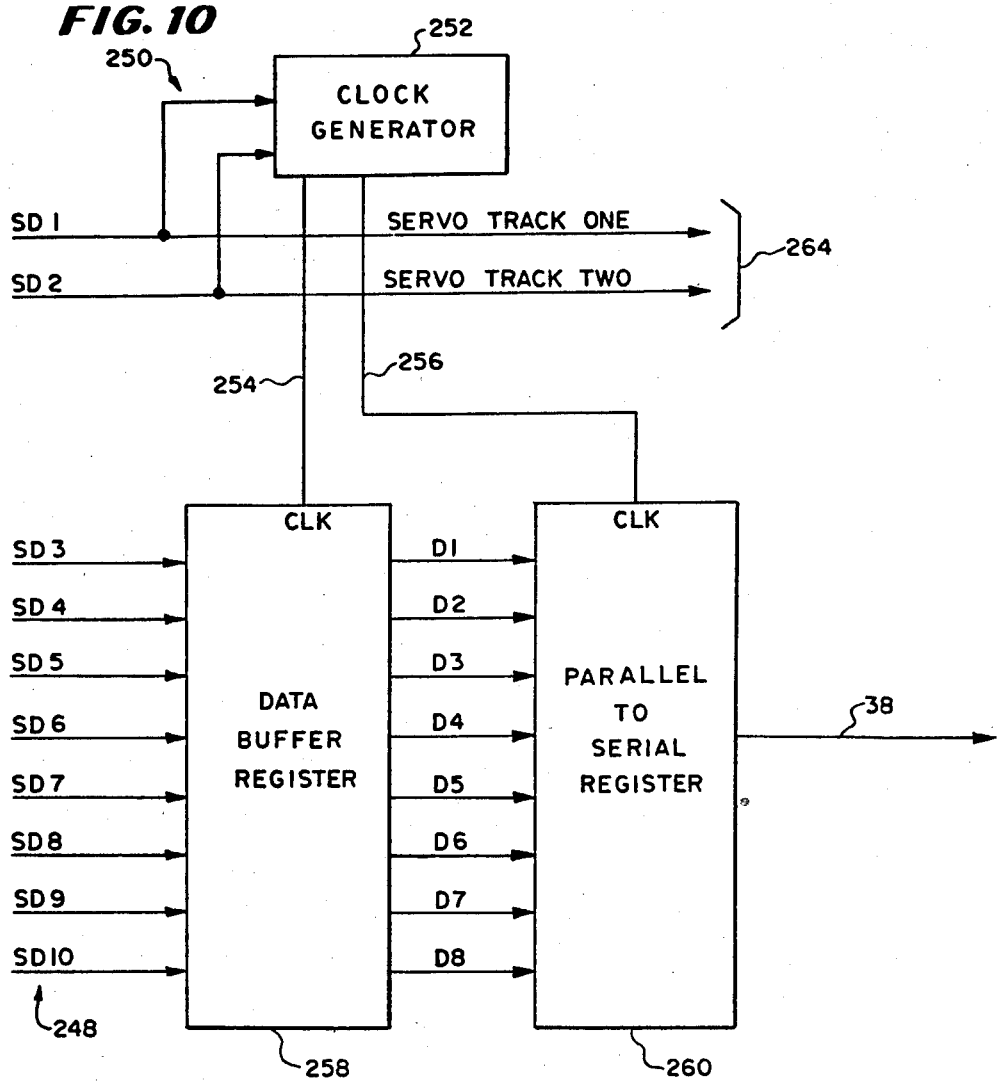
FIG. 10 is a schematic diagram of the output data handling electronics of the reading device.

In FIG. 10, the signals on leads 248 are indicated as ten sensed data bits SD1–SD10. Output data handling circuit 250 comprises a clock generator 252 receiving the signals SD1, SERVO TRACK ONE, and SD2, SERVO TRACK TWO. These two signals are from rows 1 and 2 of the recorded data. From these two signals clock generator 252 produces two clock signals on leads 254 and 256. A data buffer register 258 receives the data bit signals SD3–SD10 and the clock signal on lead 254. Register 258 outputs the signals SD3–SD10 in timed relationship with the clock signal on lead 254 to parallel to serial register 260 on leads D1–D8. Register 260 serializes the data for output on lead 38 to the digital data user, see FIG. 2.

The timing of the transfer of data into and out of each register under control of clock signals is elementary and is therefore not illustrated in the drawing. This applies both to the reader and to the recorder.

The data signals SD1 and SD2 also are passed to a controller 262 on leads 264. Controller 262 uses these signals to advance medium 136 through driving means 266 over leads 268. Controller 262 also uses these signals to pivot glass plate 216 around pivot 270 by way of galvanometer 272 and leads 274. Plate 216 is rotated around pivot 270 to optimize the alignment of the reading rays in beam 204 with the rows of each line of data carried on medium 136. Essentially, the plate 216 is rotated to maximize the signals obtained on leads SD1 and SD2 by better aligning reading rays 1 and 2 with data rows 1 and 2. This automatically aligns the reading rays 3–10 with data rows 3–10, maximizing the signals received therefrom. A parallel to this alignment structure is known in magnetic disk technology where a galvanometer is used to move magnetic reading heads to increase the amplitude of the sensed magnetic signal.

The width W of the medium 136 is approximately 105 millimeters or just over four inches. The diameter D of the image elements such as 168 is approximately 5 microns or less, down to about 1 micron. The length of medium 136 is as desired.

A tremendous amount of data can be recorded and stored on, and read from medium 136 using the described apparatus, materials and methods. For example, a length of medium 136 that is fifty feet long can be used. This will require a feed and take-up spool no larger than a super 8 millimeter home movie reel. The medium is about four inches wide and the elements have a diameter of about microns or about 0.0002 inches. Each four inch long image row then contains about 20,000 elements and each ten row image line contains about 160,000 elements, there being eight data rows for every ten row image line. Each image line will have a width of 0.002 inch, and each image line will represent $1.6 \times 10^5$ data bits. One foot of image lines then will represent $9.6 \times 10^8$ data bits, and 50 feet of medium 136 will represent 48 billion data bits. Using one micron image elements, which are attainable using present technology, $1.2 \times 10^{12}$ or 1.2 trillion data bits can be stored on the 50 foot length of medium 136. This is a tremendous amount of digital data and is believed to be several orders of magnitude greater than any comparably sized system previously known.

Another advantage of this system is that the storage medium is so inexpensive it can simply be discarded after the data carried thereon is obsolete. This is in contrast to the expensive media typically used in previous optical mass memory systems.

The optical mass memory system disclosed herein will find particular advantage where large blocks of data are to be recorded and read. This would be in situations of a memory dump where the entire contents of a large magnetic or integrated circuit memory are to be saved indefinitely and reloaded at a later time. Stepping through sequential main memory locations and recording only the contents thereof, not the address, with the instant optical mass memory system for later retrival is one advantageous application.

Other codes may be used in recording and reading the data other than the alternating patterns described to be formed in rows one and two. For example, a Manchester MFM or M²FM code can be used to record and recover the data from the storage medium. Modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. For use in an optical mass memory system, a method of reading digital data represented by a toned image carried by a transparent medium, the medium having a length and a width and the toned image being formed of opaque areas and at least translucent areas forming optically discernable elements arranged in a pattern on the medium, the digital data being represented by said elements, said method comprising:
   providing a plurality of rays spaced from one another of radiant energy, each ray having a size just smaller than the size of said elements;
   scanning said toned image with said rays by deflecting said rays across the width and length of said medium in a pattern corresponding to the pattern in which the elements are arranged on the medium;
   sensing the radiant energy from each of said rays that is transmitted through said member at said at least translucent elements and converting the transmitted radiant energies into analog electrical signals; and
   converting said analog electrical signals into digital electrical signals representing said digital data.

2. For use in an optical mass memory system, a device for reading digital data represented by a toned image carried by a transparent medium, the medium having a length and a width and the toned image being formed of opaque areas and at least translucent areas forming optically discernible elements arranged in a pattern on the medium, the digital data being represented by said elements, said device comprising:
   radiant energy means providing a plurality of rays spaced from one another, each of said rays of radiant energy having a size just smaller than the size of one of said elements;
   scanning means for scanning said toned image with said rays by deflecting said rays across the width and length of said medium in a pattern corresponding to the pattern in which the elements are arranged on the medium;
   sensor means for sensing the radiant energy from said rays that is transmitted through said member at said at least translucent elements and converting the transmitted radiant energies into analog electrical signals; and
   converter means for converting said analog electrical signals into digital electrical signals representing said digital data.

3. The device of claim 2 in which said sensor means include lens means located on a side of said medium opposite said radiant energy means for diffracting each of said rays that pass through said medium onto respective bar sensors.

4. The device of claim 2 in which the elements represent the digital data in coded form and the converter means include decoder means for decoding the digital data from the digital electrical signals.

5. The device of claim 2 wherein said medium comprises a transparent substrate and a thin transparent coating bonded to one surface of said substrate, said thin coating being formed of a resinous material compatible structurally with said substrate, having a softening range lower than said substrate and being capable of being preferentially softened relative to the substrate, said thin coating having embedded therein a toned image in the form of an array of optically discernable elements representing digital data and functioning as a storage medium.

6. The device of claim 5 and a housing having a take-up spool and a feed spool with the medium having ends that are wound upon said spools, there being a planar portion of said medium extending from spool to spool.

* * * * *